US012581442B2

(12) United States Patent
Medles et al.

(10) Patent No.: US 12,581,442 B2
(45) Date of Patent: Mar. 17, 2026

(54) SYNCHRONIZATION AND FEEDER LINK DELAY DRIFT IN NON-TERRESTRIAL NETWORK COMMUNICATIONS

(71) Applicant: MediaTek Singapore Pte. Ltd., Singapore (SG)

(72) Inventors: Abdelkader Medles, Cambridge (GB); Gilles Charbit, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 308 days.

(21) Appl. No.: 18/283,448

(22) PCT Filed: Jan. 30, 2022

(86) PCT No.: PCT/CN2022/075150
§ 371 (c)(1),
(2) Date: Sep. 22, 2023

(87) PCT Pub. No.: WO2022/199257
PCT Pub. Date: Sep. 29, 2022

(65) Prior Publication Data
US 2024/0155527 A1    May 9, 2024

Related U.S. Application Data

(60) Provisional application No. 63/165,302, filed on Mar. 24, 2021.

(51) Int. Cl.
*H04W 56/00* (2009.01)
*H04B 7/185* (2006.01)
(Continued)

(52) U.S. Cl.
CPC ...... *H04W 56/0045* (2013.01); *H04B 7/1851* (2013.01); *H04W 72/1273* (2013.01); *H04W 72/231* (2023.01); *H04W 84/06* (2013.01)

(58) Field of Classification Search
CPC ......... H04W 56/0045; H04W 72/1273; H04W 72/231; H04W 84/06; H04B 7/1851; H04B 7/18519
See application file for complete search history.

(56) References Cited

U.S. PATENT DOCUMENTS

2022/0046486 A1* 2/2022 Shrestha ........... H04W 36/0009
2022/0046566 A1* 2/2022 Leng ................. H04W 56/0045
(Continued)

FOREIGN PATENT DOCUMENTS

CN          102356678 A  *  2/2012  ........ H04W 56/0045
KR       20110061978 A  *  6/2011  ............ G01S 5/021
WO    WO 2016165353 A1   10/2016

OTHER PUBLICATIONS

Zhang et al., "of the time in the uplink multipoint receiving advance amount adjusting method and device", Feb. 15, 2012, CN, CN 102356678, English translation (Year: 2012).*
(Continued)

*Primary Examiner* — Michael K Phillips
(74) *Attorney, Agent, or Firm* — Andy M. Han; Han IP PLLC

(57) ABSTRACT

Various solutions for synchronization and feeder link delay drift in non-terrestrial network (NTN) communications are described. An apparatus (e.g., a UE) receives from a network information of a common timing advance (TA), a common TA drift rate, and a common TA drift rate variation at a reference time. The apparatus determines a TA delay based on the information. The apparatus then performs NTN communications with the network with the TA delay accounted for.

19 Claims, 4 Drawing Sheets

300

RECEIVE, BY A PROCESSOR OF AN APPARATUS, FROM A NETWORK INFORMATION OF A COMMON TIMING ADVANCE (TA), A COMMON TA DRIFT RATE, AND A COMMON TA DRIFT RATE VARIATION AT A REFERENCE TIME
310

DETERMINE, BY THE PROCESSOR, A TA DELAY BASED ON THE INFORMATION
320

PERFORM, BY THE PROCESSOR, NON-TERRESTRIAL NETWORK (NTN) COMMUNICATIONS WITH THE NETWORK WITH THE TA DELAY ACCOUNTED FOR
330

(51) Int. Cl.
| | | |
|---|---|---|
| *H04W 72/1273* | (2023.01) | |
| *H04W 72/231* | (2023.01) | |
| *H04W 84/06* | (2009.01) | |

(56) References Cited

U.S. PATENT DOCUMENTS

| | | | | |
|---|---|---|---|---|
| 2022/0232503 | A1* | 7/2022 | Cheng | H04W 56/009 |
| 2022/0263570 | A1* | 8/2022 | Wang | H04B 7/18513 |
| 2023/0031427 | A1* | 2/2023 | Manolakos | G01S 5/0018 |
| 2023/0049008 | A1* | 2/2023 | Nishio | H04B 7/1853 |
| 2024/0064677 | A1* | 2/2024 | Yan | H04W 56/0015 |
| 2024/0121737 | A1* | 4/2024 | Shin | H04B 7/1851 |

OTHER PUBLICATIONS

Lee, "Method for Correcting Position Based Networking in Shadow Area by Using Automatic Position Tracking Function of GPS Mobile Terminal and System Thereof", Jun. 10, 2011, KR, KR 20110061978, English translation (Year: 2011).*

Samsung: "Enhancements on UL time and frequency synchronization for NTN", 3GPP Draft, R1-2008165, 3GPP RAN WG1, e-Meeting, Oct. 26, 2020-Nov. 13, 2020, Oct. 23, 2020, XP051945342 (Year: 2020).*

Moderator (Thales): "FL Summary on enhancements on UL time and frequency synchronization for NR", 3GPP Draft, R1-2101938, 3GPP RAN WG1, e-Meeting, Jan. 25, 2021-Feb. 5, 2021, Jan. 29, 2021, XP051976013 (Year: 2021).*

European Patent Office, Partial Supplementary European Search Report in European Patent Application No. 22773919.0, Jan. 2, 2025.

Spreadtrum Communications: "Consideration on enhancements on UL time and frequency synchronization", 3GPP TSG RAN WG1 #103-e, R1-2009153, E-Meeting, Oct. 26, 2020-Nov. 13, 2020, Oct. 24, 2020.

Huawei et al: "Discussion on UL time and frequency synchronization enhancement for NTN", 3GPP TSG RAN WG1 Meeting #104-e, R1-2100223, E-meeting, Jan. 25, 2021-Feb. 5, 2021, Jan. 19, 2021.

Cewit et al: "UL time synchronization methods for NTN systems", 3GPP TSG RAN WG1 #104-e, R1-2101717, e-Meeting, Jan. 25, 2020-Feb. 5, 2020, Jan. 21, 2021.

CMCC: "Considerations on Timing Advance for Non-Terrestrial Networks", 3GPP TSG RAN WG1 #98 bis, R1-1910165, Chongqing, China, Oct. 14-20, 2019.

Thales: "Feature lead Summary on enhancements on UL time and frequency synchronization for NR NTN", 3GPP TSG-RAN WG1 Meeting #102-e, R1-2007057, e-Meeting, Aug. 17-28, 2020.

Oppo: "Discussion on enhancement of UL time and frequency synchronization", 3GPP TSG RAN WG1 #103-e, R1-2008254, e-Meeting, Oct. 26-Nov. 13, 2020.

Huawei et al.: "Discussion on UL time and frequency synchronization enhancement for NTN", 3GPP TSG RAN WG1 Meeting #104-e, R1-2100223, E-meeting, Jan. 25-Feb. 5, 2021.

Mediatek: "UE Time and frequency Synchronisation for NR-NTN", 3GPP TSG RAN WG1 Meeting #105-e, R1-2105952, e-Meeting, May 10-27, 2021.

Mediatek: "UE Time and frequency Synchronisation for NR-NTN", 3GPP TSG RAN WG1 Meeting #106bis-e, R1-2109169, e-Meeting, Oct. 11-19, 2021.

European Patent Office, Extended Supplementary European Search Report in European Patent Application No. 22773919.0, Feb. 19, 2025.

Samsung: "Enhancements on UL time and frequency synchronization for NTN", 3GPP Draft, R1-2008165, 3GPP RAN WG1, e-Meeting, Oct. 26, 2020-Nov. 13, 2020, Oct. 23, 2020, XP051945342.

Moderator (Thales): "FL Summary on enhancements on UL time and frequency synchronization for NR", 3GPP Draft, R1-2101938, 3GPP RAN WG1, e-Meeting, Jan. 25, 2021-Feb. 5, 2021, Jan. 29, 2021, XP051976013.

* cited by examiner (A)

100

Feeder Link Delay
+t$_F$

Base
Station

120

128

$T_{Ref}$

SAT

125

Propagation
Delay

+t$_d$ = |$\vec{U}_{sat\_UE}$|/c $\vec{U}_{sat\_UE}$

Forward
Link

UE

110

$T_{DL} = T_{Ref} + t_F + t_d$ (B)

$\vec{V}_{Sat}$     SAT     125

$\vec{U}_{sat\_UE}$

UE

110

$f_{Doppler} = <\vec{V}_{Sat} , \vec{U}_{sat\_UE}>/|\vec{U}_{sat\_UE}| \times f_c/c$

300

RECEIVE, BY A PROCESSOR OF AN APPARATUS, FROM A
NETWORK INFORMATION OF A COMMON TIMING ADVANCE
(TA), A COMMON TA DRIFT RATE, AND A COMMON TA DRIFT
RATE VARIATION AT A REFERENCE TIME
310

DETERMINE, BY THE PROCESSOR, A TA DELAY BASED ON
THE INFORMATION
320

PERFORM, BY THE PROCESSOR, NON-TERRESTRIAL
NETWORK (NTN) COMMUNICATIONS WITH THE NETWORK
WITH THE TA DELAY ACCOUNTED FOR
330

400 —

```
┌─────────────────────────────────────────┐
│                                         │
│  RECEIVE, BY A PROCESSOR OF AN APPARATUS, A GROUP │
│  COMMON TIMING ADVANCE (TA) COMMAND FROM A │
│             NETWORK                     │
│               410                       │
│                                         │
└─────────────────────────────────────────┘
```

```
┌─────────────────────────────────────────┐
│                                         │
│  ADJUST, BY THE PROCESSOR, A FEEDER LINK TA DELAY │
│  BASED ON INFORMATION IN THE GROUP COMMON TIMING TA │
│             COMMAND                     │
│               420                       │
│                                         │
└─────────────────────────────────────────┘
```

```
┌─────────────────────────────────────────┐
│                                         │
│  PERFORM, BY THE PROCESSOR, NON-TERRESTRIAL │
│  NETWORK (NTN) COMMUNICATIONS WITH THE NETWORK │
│  WITH THE ADJUSTED FEEDER LINK TA ACCOUNTED FOR │
│               430                       │
│                                         │
└─────────────────────────────────────────┘
```

FIG. 4

SYNCHRONIZATION AND FEEDER LINK DELAY DRIFT IN NON-TERRESTRIAL NETWORK COMMUNICATIONS

CROSS REFERENCE TO RELATED PATENT APPLICATION(S)

The present disclosure is part of U.S. National Stage filing of International Patent Application No. PCT/CN2022/075150, filed 30 Jan. 2022, which is part of a non-provisional application claiming the priority benefit of U.S. Patent Application No. 63/165,302, filed 24 Mar. 2021, the content of which being incorporated by reference in its entirety.

TECHNICAL FIELD

The present disclosure is generally related to mobile communications and, more particularly, to synchronization and feeder link delay drift in non-terrestrial network (NTN) communications.

BACKGROUND

Unless otherwise indicated herein, approaches described in this section are not prior art to the claims listed below and are not admitted as prior art by inclusion in this section.

In NTN communications, in case that a reference point for time is at the gateway (e.g., base station), a user equipment (UE) would need to know the feeder link delay on a feeder link when calculating the timing advance (TA) for time synchronization on an uplink (UL) transmission from the UE to a non-terrestrial (NT) network node (e.g., satellite) over a service link. One way for the UE to obtain knowledge of the feeder link delay is through broadcast of the feeder link delay on a downlink (DL) transmission from the network to the UE. However, both the feeder link delay and a drift rate of the feeder link delay tend to vary overtime. For example, the feeder link delay can experience a drift rate as high as +/−24 μs/sec (or +/−24 ppm), and the delay drift rate itself can experience a variation up to +/−0.29 μs/sect. To minimize signaling overhead of the feeder link delay, on one hand, it is imperative to define an efficient way of signaling that reduces both of the overhead and power consumption by the UE in signal decoding. On the other hand, some UEs which are not capable of simultaneous radio access network (RAN) reception and transmission as well as Global Navigation Satellite System (GNSS) operation may require a GNSS measurement window; however, such a window tends to lead to degradation in system performance if applied to all UEs. Therefore, there is a need for a solution for synchronization and feeder link delay drift in NTN communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues. More specifically, various schemes proposed in the present disclosure are believed to address issues pertaining to synchronization and feeder link delay drift in NTN communications.

In one aspect, a method may involve an apparatus (e.g., a UE) receiving, by a processor of an apparatus, from a network information of a common TA, a common TA drift rate, and a common TA drift rate variation at a reference time. The method may also involve the apparatus determining a TA delay based on the information. The method may further involve the apparatus performing NTN communications with the network with the TA delay accounted for.

In another aspect, a method may involve an apparatus (e.g., a UE) receiving a group common TA command from a network. The method may also involve the apparatus adjusting a feeder link TA delay based on information in the group common timing TA command. The method may further involve the apparatus performing NTN communications with the network with the adjusted feeder link TA accounted for.

It is noteworthy that, although description provided herein may be in the context of certain radio access technologies, networks and network topologies such as NTN communications, the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, 5th Generation (5G), New Radio (NR), Internet-of-Things (IoT), Narrow Band Internet of Things (NB-IoT), Industrial Internet of Things (IIoT), vehicle-to-vehicle (V2V) and vehicle-to-everything (V2X) communications. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 4 is a flowchart of an example process in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to synchronization and feeder link delay drift in NTN communications. According to the present disclosure, a number of possible solutions may be implemented separately or jointly. That is, although these possible solutions may be described below separately, two or more of these possible solutions may be implemented in one combination or another.

Figure 1:
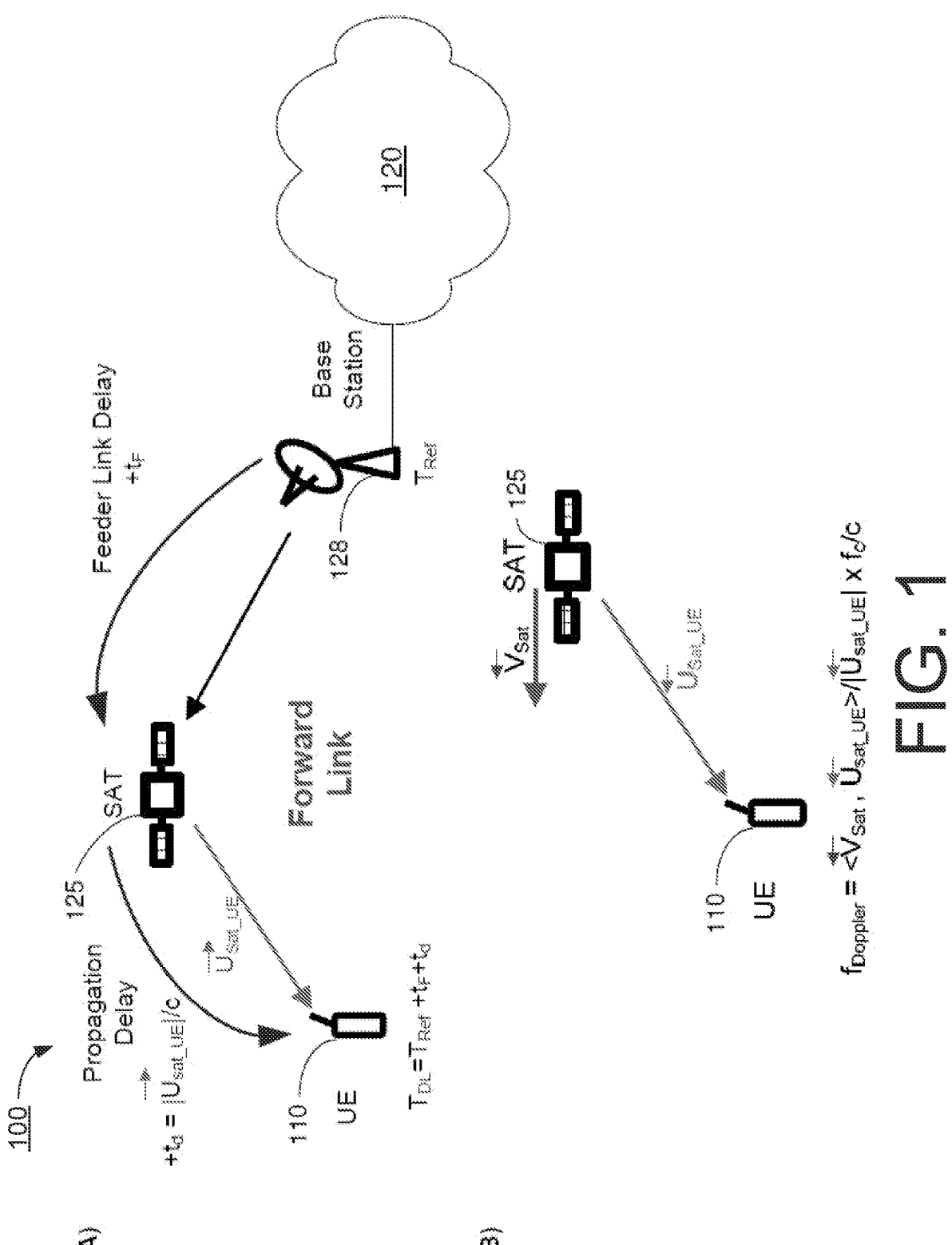
FIG. 1 is a diagram of an example network environment in which various proposed schemes in accordance with the present disclosure may be implemented.

FIG. 1 illustrates an example network environment 100 in which various proposed schemes in accordance with the present disclosure may be implemented. Network environment 100 may involve a UE 110 and a wireless network 120 (e.g., an LTE network, a 5G network, an NR network, an IoT network, an NB-IoT network, an IIoT network or an NTN network). UE 110 may communicate with wireless network 120 via a non-terrestrial (NT) network node 125 (e.g., a satellite) and/or a terrestrial network node 128 (e.g., a gateway, base station, eNB, gNB or transmission/reception point (TRP)). Referring to part (A) and part (B) of FIG. 1, NT network node 125 may be moving at a speed of $V_{sat}$ with a relative motion/velocity of $U_{sat\_UE}$ with respect to UE 110, and there may be a feeder link delay $t_F$ associated with the feeder link between terrestrial network node 128 and NT network node 125. Correspondingly, a propagation delay to and a Doppler shift $f_{Doppler}$ may result. In FIG. 1, fc denotes the frequency of a carrier signal, c denotes the speed of light, $T_{Ref}$ denotes the reference point for time (or reference time) at terrestrial network node 128, $t_F$ denotes the feeder link delay on the feeder link between NT network node 125 and terrestrial network node 128, and $T_{DL}$ denotes the DL delay (or service link delay) between NT network node 125 and UE 110. Under various proposed schemes in accordance with the present disclosure, each of UE 110, NT network node 125 and terrestrial network node 128 may be configured to perform operations pertaining to synchronization and feeder link delay drift in NTN communications, as described below.

Under a first proposed scheme in accordance with the present disclosure, the feeder link delay for a given reference time t0 may be determined based on a number of parameters including: a feeder link delay at the reference time (D0), a feeder link average delay drift rate (D1), and a feeder link delay drift variation rate (D2). Given such parameters, the feeder link delay at time t may be derived as $D(t)=D0+D1*(t-t0)+D2*(t-t0)^2/2$ or, alternatively, as $D(t)=D0+D1*(t-t0)+D2*(t-t0)^2$. Instantaneous delay drift rate (drift_rate(t)) may be derived as drift_rate(t)=D1+D2*(t-t0) or, alternatively, as drift_rate(t)=D1+2*D2*(t-t0). The signaled values of D0, D1 and D2 do not need to have theoretical values and, rather, may be optimized to achieve best performance. Under the first proposed scheme, the TA component due to the feeder link delay may be derived as TA(t)=2*D(t).

Alternatively, instead of signaling the feeder link delay (or drift rate and drift variation rate), the signaling from network 120 to UE 110 may indicate or otherwise correspond to another set of parameters including: a feeder link TA component at t0 (B0), a feeder link TA drift rate (B1), and a feeder link TA drift variation rate (B2). In such cases, the TA component due to the feeder link delay may be derived as $TA(t)=B0+B1*(t-t0)+B2*(t-t0)^2/2$ or, alternatively, as $TA(t)=B0+B1*(t-t0)+B2*(t-t0)^2$. Higher order variation of the delay/TA may as well be supported (e.g., D0, D1, D2, D3, . . . and so on).

Under the first proposed scheme, information for the feeder link delay/TA may be assumed to be valid at the fixed reference t0 corresponding to the satellite (e.g., NT network node 125) or the gateway/base station (e.g., terrestrial network node 128). The fixed reference may correspond to the system frame number (SFN) frame boundary at or immediately after the ending boundary of the system information (SI) window in which the corresponding system information block (SIB) is transmitted. Other fixed choices to be used as the time reference may be possible for the start of the frame or fixed offset from the start or end of the frame or slot in which the SIB is transmitted. In an event that t0 corresponds to a reference at the gateway/base station (e.g., terrestrial network node 128), it may be assumed that the DL/UL transmissions are aligned at this reference with the time t used for calculation of TA corresponding to the UL reception time at the gateway/base station. Alternatively, in an event that t0 corresponds to a reference at the satellite (e.g., NT network node 125), it may be assumed that the time t used for calculation of TA may correspond to the UL reception time at the satellite.

Under a second proposed scheme in accordance with the present disclosure, alternative signaling of the feeder link delay timing advance may be used. That is, the signaling may leverage known functions. For instance, when applied to the feeder link delay, the feeder link delay at time t may be derived as $D(t)=D0+D1*f((t-t0+D2)/D3)$. Here, $f(\cdot)$ denotes the function used, and $f(\cdot)$ may be the primitive function of arctan, such as: $f(x)=x*arctan(x)-0.5*log(1+x^2)+constant$. Other functions may be feasible. It is noteworthy that not all of D0, D1, D2 and D3 need to be signaled. For instance, some of D0, D1, D2 and D3 may be signaled while one or more others may have fixed value(s) and thus need not be signaled.

Under a third proposed scheme in accordance with the present disclosure, in order to perform adjustment of feeder link delay, a group common TA command may be supported. The group common TA command may be addressed to all UEs in a group or in a cell. The group common TA command may be transmitted on a physical downlink control channel (PDCCH) with a specific downlink control information (DCI) format. Alternatively, the group common TA command may be transmitted with an existing DCI format using a group common radio network temporary identifier (RNTI). Still alternatively, the group common TA command may be a part of a medium access control (MAC) control element (CE) scheduled on a group common physical downlink shared channel (PDSCH) allocation.

Under a fourth proposed scheme in accordance with the present disclosure, a UE capability of simultaneous operation with GNSS may be signaled by UE 110 to network 120. Alternatively, by default, network 120 may assume that UE 110 is capable of simultaneous operation with GNSS unless UE 110 signals to network 120 to indicate that UE 110 is uncapable of such simultaneous operation. Furthermore, UE 110 may transmit a request to network 120 requesting a GNSS measurement window for immediate synchronization, and network 120 may acknowledge such a request. Under the fourth proposed scheme, network 120 may trigger to UE 110 to perform GNSS re-acquisition. For instance, in an event that a trigger is transmitted by network 120 to UE 110 with no capability of simultaneous operation with GNSS, the trigger may also be used to allocate a GNSS measurement window. Moreover, in case that UE 110 detects a link failure and/or inability to communicate with network 120 through a random access channel (RACH) or physical uplink shared channel (PUSCH) or other UL transmission, UE 110 may perform GNSS measurement before attempting to access or transmit to network 120.

In view of the above, certain features under the various proposed schemes are highlighted below.

In one aspect, network 120 may broadcast (e.g., in a SIB) information including common TA, common TA drift rate, and common TA drift rate variation at a fixed reference time. The TA delay may be a feeder link TA. The fixed reference time may be a frame (SFN) boundary at or immediately after an ending boundary of a SI window in which the corresponding SIB is transmitted. Alternatively, the fixed reference time may be a start of the frame or a fixed offset from the start or end of the frame or a slot in which the SIB is transmitted.

Moreover, when DL and UL subframes are aligned at terrestrial network node 128 at the fixed reference time, the time t used for calculation of the TA may correspond to an UL reception time at terrestrial network node 128. Alternatively, when DL and UL subframes are aligned at NT network node 125 at the fixed reference time, the time t used for calculation of the TA may correspond to an UL reception time at NT network node 125.

Furthermore, the TA component due to the feeder link delay may be derived as $TA(t)=2*D(t)$, where the delay at time t may be derived from the fixed reference time t0 as $D(t)=D0+D1*(t-t0)+D2*(t-t0)^2$. The delay at time t may be derived from the fixed time reference t0 using a function $f(\cdot)$ as $D(t)=D0+D1*f((t-t0+D2)/D3)$. One example of the function $f(\cdot)$ may be $x*\arctan(x)-0.5*\log(1+x^2)+constant$. In addition, one or more of D0, D1, D2, D3 and $f(\cdot)$ may be signaled or defined in the 3GPP specification (e.g., Release 17 or Release 18 of the 3GPP specification).

In another aspect, adjustment of a feeder link TA for a group of UEs may be performed using a group common TA command. The group common TA command may be addressed to all UEs in a group or a cell. The group common TA command may be transmitted on a PDCCH with a specific DCI format or an existing DCI format using a group common RNTI. Alternatively, the group common TA command may be a part of a MAC CE scheduled on a group common PDSCH allocation. In case that UE 110 is capable of simultaneous operation with GNSS, UE 110 may signal such capability to network 120. Moreover, UE 110 may transmit a request to network 120 to request for a GNSS measurement window for immediate synchronization which may be acknowledged by network 120.

Illustrative Implementations

Figure 2:
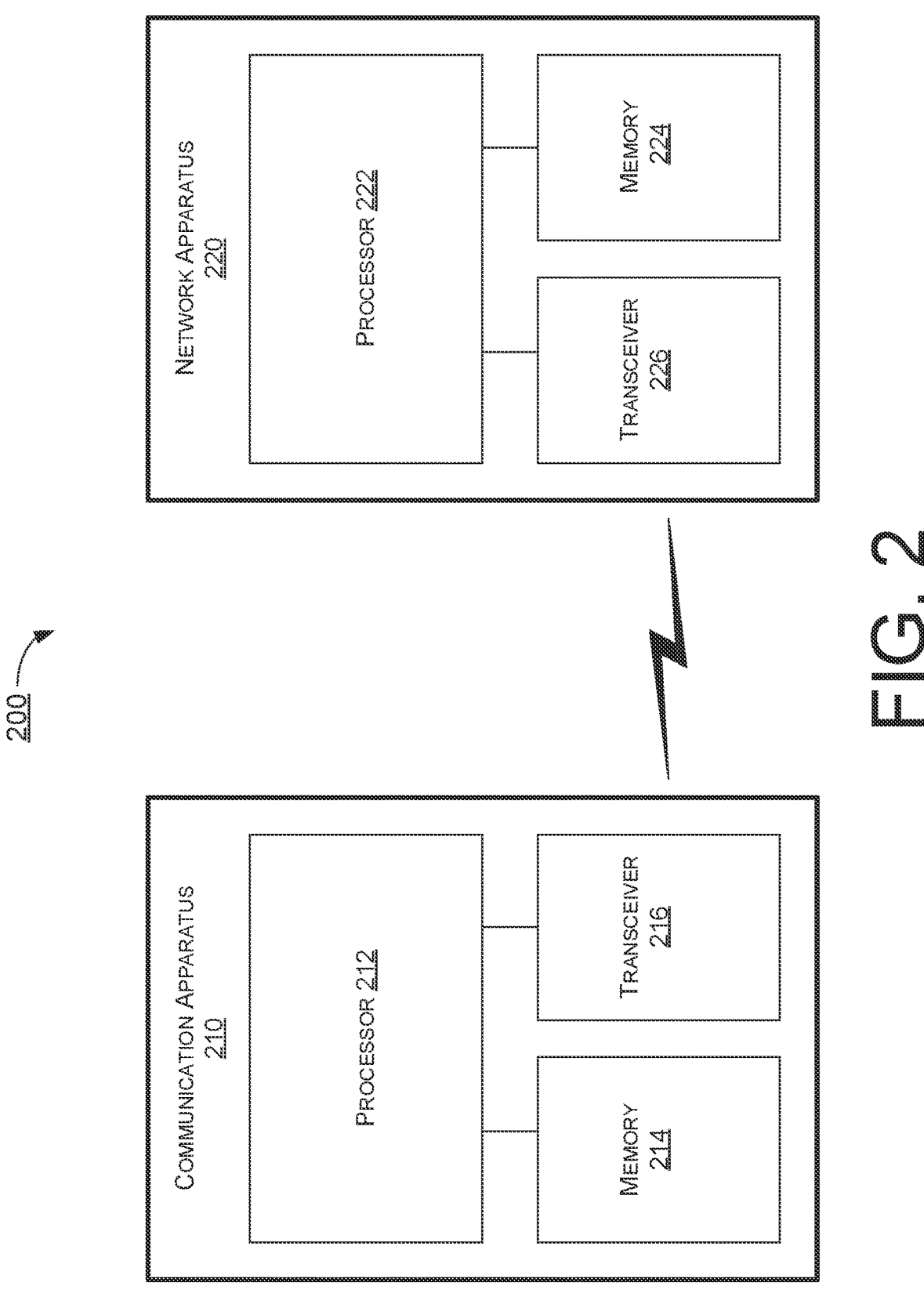
FIG. 2 is a block diagram of an example communication system in accordance with an implementation of the present disclosure.

FIG. 2 illustrates an example communication system 200 having an example communication apparatus 210 and an example network apparatus 220 in accordance with an implementation of the present disclosure. Each of communication apparatus 210 and network apparatus 220 may perform various functions to implement schemes, techniques, processes and methods described herein pertaining to synchronization and feeder link delay drift in NTN communications, including scenarios/schemes described above as well as process(es) described below.

Communication apparatus 210 may be a part of an electronic apparatus, which may be a UE such as a portable or mobile apparatus, a wearable apparatus, a wireless communication apparatus or a computing apparatus. For instance, communication apparatus 210 may be implemented in a smartphone, a smartwatch, a personal digital assistant, a digital camera, or a computing equipment such as a tablet computer, a laptop computer or a notebook computer. Communication apparatus 210 may also be a part of a machine type apparatus, which may be an IoT, NB-IoT, IIoT or NTN apparatus such as an immobile or a stationary apparatus, a home apparatus, a wire communication apparatus or a computing apparatus. For instance, communication apparatus 210 may be implemented in a smart thermostat, a smart fridge, a smart door lock, a wireless speaker or a home control center. Alternatively, communication apparatus 210 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 210 may include at least some of those components shown in FIG. 2 such as a processor 212, for example. Communication apparatus 210 may further include one or more other components not pertinent to the proposed scheme of the present disclosure (e.g., internal power supply, display device and/or user interface device), and, thus, such component(s) of communication apparatus 210 are neither shown in FIG. 2 nor described below in the interest of simplicity and brevity.

Network apparatus 220 may be a part of an electronic apparatus/station, which may be a network node such as a base station, a small cell, a router, a gateway or a satellite. For instance, network apparatus 220 may be implemented in an eNodeB in an LTE, in a gNB in a 5G, NR, IoT, NB-IoT, IIoT, or in a satellite in an NTN network. Alternatively, network apparatus 220 may be implemented in the form of one or more IC chips such as, for example and without limitation, one or more single-core processors, one or more multi-core processors, or one or more RISC or CISC processors. Network apparatus 220 may include at least some of those components shown in FIG. 2 such as a processor 222, for example. Network apparatus 220 may further include one or more other components not pertinent to the proposed scheme of the present disclosure (e.g., internal power supply, display device and/or user interface device), and, thus, such component(s) of network apparatus 220 are neither shown in FIG. 2 nor described below in the interest of simplicity and brevity.

In one aspect, each of processor 212 and processor 222 may be implemented in the form of one or more single-core processors, one or more multi-core processors, one or more RISC processors, or one or more CISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including synchronization and feeder link delay drift in NTN communications in accordance with various implementations of the present disclosure.

In some implementations, communication apparatus 210 may also include a transceiver 216 coupled to processor 212 and capable of wirelessly transmitting and receiving data. In some implementations, communication apparatus 210 may further include a memory 214 coupled to processor 212 and capable of being accessed by processor 212 and storing data therein. In some implementations, network apparatus 220 may also include a transceiver 226 coupled to processor 222 and capable of wirelessly transmitting and receiving data. In some implementations, network apparatus 220 may further include a memory 224 coupled to processor 222 and capable of being accessed by processor 222 and storing data therein. Accordingly, communication apparatus 210 and network apparatus 220 may wirelessly communicate with each other via transceiver 216 and transceiver 226, respectively.

Each of communication apparatus 210 and network apparatus 220 may be a communication entity capable of communicating with each other using various proposed schemes in accordance with the present disclosure. To aid better understanding, the following description of the operations, functionalities and capabilities of each of communication apparatus 210 and network apparatus 220 is provided in the context of a mobile communication environment in which communication apparatus 210 is implemented in or as a communication apparatus or a UE (e.g., UE 110) and network apparatus 220 is implemented in or as a network node or base station (e.g., NT network node 125 or terrestrial network node 128) of a communication network (e.g., network 120). It is also noteworthy that, although the example implementations described below are provided in the context of NTN communications, the same may be implemented in other types of networks.

Under a proposed scheme pertaining to synchronization and feeder link delay drift in NTN communications in accordance with the present disclosure, with communication apparatus 210 implemented in or as UE 110 and network apparatus 220 implemented in or as NT network node 125 or terrestrial network node 128 in network environment 100, processor 212 of communication apparatus 210 may receive, via transceiver 216, from a network (e.g., network 120 via apparatus 220 as NT network node 125 or terrestrial network node 128) information of a common TA, a common TA drift rate, and a common TA drift rate variation at a reference time. Additionally, processor 212 may determine a TA delay based on the information. Moreover, processor 212 may perform, via transceiver 216, NTN communications with the network with the TA delay accounted for.

In some implementations, in determining the TA delay, processor 212 may determine a feeder link TA.

In some implementations, the reference time may include a fixed reference time which is a frame boundary at or after an ending boundary of a SI window in which a SIB containing the information is transmitted. Alternatively, the reference time may include a fixed reference time which is a start of a frame or a fixed offset from the start or an end of the frame or slot in which a SIB containing the information is transmitted.

In some implementations, DL and UL subframes in the NTN communications may be aligned at a terrestrial network node of the network at the reference time. In such cases, a time used in determining the TA delay may correspond to an UL reception time at the terrestrial network node. Alternatively, DL and UL subframes in the NTN communications may be aligned at an NT network node of the network at the reference time. In such cases, the time used in determining the TA delay may correspond to an UL reception time at the NT network node.

In some implementations, in determining the TA delay, processor 212 may determine a TA component (TA(t)) due to a feeder link delay (D(t)) in the NTN communications as $TA(t)=2*D(t)$.

In some implementations, in determining the TA delay, processor 212 may determine a feeder link delay (D(t)) at a time t from the reference time (t0) as $D(t)=D0+D1*(t-t0)+D2*(t-t0)^2$, where: D0 denotes a feeder link delay at the reference time, D1 denotes a feeder link average delay drift rate, and D2 denotes a feeder link delay drift variation rate. In some implementations, a value of at least one of the D0, D1 and D2 is signaled by the network. Alternatively, or additionally, another value of at least one of the D0, D1 and D2 is defined in a 3GPP specification.

Under another proposed scheme pertaining to synchronization and feeder link delay drift in NTN communications in accordance with the present disclosure, with communication apparatus 210 implemented in or as UE 110 and network apparatus 220 implemented in or as NT network node 125 or terrestrial network node 128 in network environment 100, processor 212 of communication apparatus 210 may receive, via transceiver 216, a group common TA command from a network (e.g., network 120 via apparatus 220 as NT network node 125 or terrestrial network node 128). Moreover, processor 212 may adjust a feeder link TA delay based on information in the group common timing TA command. Furthermore, processor 212 may perform, via transceiver 216, NTN communications with the network with the adjusted feeder link TA accounted for.

In some implementations, in receiving the group common TA command, processor 212 may receive the group common TA command in a PDCCH with either a specific DCI format or an existing DCI format using a group common RNTI. Alternatively, in receiving the group common TA command, processor 212 may receive the group common TA command as a part of a MAC CE scheduled on a group common PDSCH allocation.

In some implementations, processor 212 may perform additional operations. For instance, processor 212 may signal, via transceiver 216, to the network a capability of simultaneous operation with a GNSS. Moreover, processor 212 may transmit, via transceiver 216, to the network a request for a GNSS measurement window. Furthermore, processor 212 may receive, via transceiver 216, from the network an acknowledgement of the request.

Illustrative Processes

Figure 3:
FIG. 3 is a flowchart of an example process in accordance with an implementation of the present disclosure.

FIG. 3 illustrates an example process 300 in accordance with an implementation of the present disclosure. Process 300 may be an example implementation of schemes described above, whether partially or completely, with respect to synchronization and feeder link delay drift in NTN communications in accordance with the present disclosure. Process 300 may represent an aspect of implementation of features of communication apparatus 210. Process 300 may include one or more operations, actions, or functions as illustrated by one or more of blocks 310, 320 and 330. Although illustrated as discrete blocks, various blocks of process 300 may be divided into additional blocks, combined into fewer blocks, or eliminated, depending on the desired implementation. Moreover, the blocks of process 300 may executed in the order shown in FIG. 3 or, alternatively, in a different order. Process 300 may be implemented by communication apparatus 210 or any suitable UE or machine type devices. Solely for illustrative purposes and without limitation, process 300 is described below in the context of communication apparatus 210 and network apparatus 220. Process 300 may begin at block 310.

At 310, process 300 may involve processor 212 of communication apparatus 210 receiving, via transceiver 216, from a network (e.g., network 120 via apparatus 220 as NT network node 125 or terrestrial network node 128) information of a common TA, a common TA drift rate, and a common TA drift rate variation at a reference time. Process 300 may proceed from 310 to 320.

At 320, process 300 may involve processor 212 determining a TA delay based on the information. Process 300 may proceed from 320 to 330.

At 330, process 300 may involve processor 212 performing, via transceiver 216, NTN communications with the network with the TA delay accounted for.

In some implementations, in determining the TA delay, process 300 may involve processor 212 determining a feeder link TA.

In some implementations, the reference time may include a fixed reference time which is a frame boundary at or after an ending boundary of a SI window in which a SIB containing the information is transmitted. Alternatively, the reference time may include a fixed reference time which is a start of a frame or a fixed offset from the start or an end of the frame or slot in which a SIB containing the information is transmitted.

In some implementations, DL and UL subframes in the NTN communications may be aligned at a terrestrial network node of the network at the reference time. In such cases, a time used in determining the TA delay may correspond to an UL reception time at the terrestrial network node. Alternatively, DL and UL subframes in the NTN communications may be aligned at an NT network node of the network at the reference time. In such cases, the time used in determining the TA delay may correspond to an UL reception time at the NT network node.

In some implementations, in determining the TA delay, process 300 may involve processor 212 determining a TA component (TA(t)) due to a feeder link delay (D(t)) in the NTN communications as $TA(t)=2*D(t)$.

In some implementations, in determining the TA delay, process 300 may involve processor 212 determining a feeder link delay (D(t)) at a time t from the reference time (t0) as $D(t)=D0+D1*(t-t0)+D2*(t-t0)^2$, where: D0 denotes a feeder link delay at the reference time, D1 denotes a feeder link average delay drift rate, and D2 denotes a feeder link delay drift variation rate. In some implementations, a value of at least one of the D0, D1 and D2 is signaled by the network. Alternatively, or additionally, another value of at least one of the D0, D1 and D2 is defined in a 3GPP specification.

FIG. 4 illustrates an example process 400 in accordance with an implementation of the present disclosure. Process 400 may be an example implementation of schemes described above, whether partially or completely, with respect to synchronization and feeder link delay drift in NTN communications in accordance with the present disclosure. Process 400 may represent an aspect of implementation of features of communication apparatus 210. Process 400 may include one or more operations, actions, or functions as illustrated by one or more of blocks 410 and 420. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may be implemented by communication apparatus 210 or any suitable UE or machine type devices. Solely for illustrative purposes and without limitation, process 400 is described below in the context of communication apparatus 210 and network apparatus 220. Process 400 may begin at block 410.

At 410, process 400 may involve processor 212 of communication apparatus 210 receiving, via transceiver 216, a group common TA command from a network (e.g., network 120 via apparatus 220 as NT network node 125 or terrestrial network node 128). Process 400 may proceed from 410 to 420.

At 420, process 400 may involve processor 212 adjusting a feeder link TA delay based on information in the group common timing TA command. Process 400 may proceed from 420 to 430.

At 430, process 400 may involve processor 212 performing, via transceiver 216, NTN communications with the network with the adjusted feeder link TA accounted for.

In some implementations, in receiving the group common TA command, process 400 may involve processor 212 receiving the group common TA command in a PDCCH with either a specific DCI format or an existing DCI format using a group common RNTI. Alternatively, in receiving the group common TA command, process 400 may involve processor 212 receiving the group common TA command as a part of a MAC CE scheduled on a group common PDSCH allocation.

In some implementations, process 400 may involve processor 212 performing additional operations. For instance, process 400 may involve processor 212 signaling, via transceiver 216, to the network a capability of simultaneous operation with a GNSS. Moreover, process 400 may involve processor 212 transmitting, via transceiver 216, to the network a request for a GNSS measurement window. Furthermore, process 400 may involve processor 212 receiving, via transceiver 216, from the network an acknowledgement of the request.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
receiving, by a processor of an apparatus, from a network information of a common timing advance (TA), a common TA drift rate, and a common TA drift rate variation at a reference time;
determining, by the processor, a TA delay based on the information; and
performing, by the processor, non-terrestrial network (NTN) communications with the network with the TA delay accounted for,
wherein the determining of the TA delay comprises determining a feeder link delay (D(t)) at a time t from the reference time (t0) as $D(t)=D0+D1*(t-t0)+D2*(t-t0)^2$, and
wherein:
D0 denotes a feeder link delay at the reference time,
D1 denotes a feeder link delay drift rate, and
D2 denotes a feeder link delay drift rate variation.

2. The method of claim 1, wherein the determining of the TA delay comprises determining a feeder link TA.

3. The method of claim 1, wherein the reference time comprises a fixed reference time which is a frame boundary at or after an ending boundary of a system information (SI) window in which a system information block (SIB) containing the information is transmitted.

4. The method of claim 1, wherein the reference time comprises a fixed reference time which is a start of a frame or a fixed offset from the start or an end of the frame or slot in which a system information block (SIB) containing the information is transmitted.

5. The method of claim 1, wherein downlink (DL) and uplink (UL) subframes in the NTN communications are aligned at a terrestrial network node of the network at the reference time, and wherein a time used in determining the TA delay corresponds to an UL reception time at the terrestrial network node.

6. The method of claim 1, wherein downlink (DL) and uplink (UL) subframes in the NTN communications are aligned at a non-terrestrial (NT) network node of the network at the reference time, and wherein a time used in determining the TA delay corresponds to an UL reception time at the NT network node.

7. The method of claim 1, wherein the determining of the TA delay comprises determining a TA component (TA(t)) due to a feeder link delay (D(t)) in the NTN communications as $TA(t)=2*D(t)$.

8. The method of claim 1, wherein a value of at least one of the D0, D1 and D2 is signaled by the network.

9. The method of claim 1, wherein a value of at least one of the D0, D1 and D2 is defined in a $3^{rd}$ Generation Partnership Project (3GPP) specification.

10. A method, comprising:
receiving, by a processor of an apparatus, a group common timing advance (TA) command from a network;
receiving, by the processor, from a network information of a common timing advance (TA), a common TA drift rate, and a common TA drift rate variation at a reference time;
adjusting, by the processor, a feeder link TA delay based on information in the group common timing TA command;
determining, by the processor, a TA delay based on the information; and
performing, by the processor, non-terrestrial network (NTN) communications with the network with the adjusted feeder link TA accounted for,
wherein the feeder link delay (D(t)) at a time t from the reference time (t0) is expressed as $D(t)=D0+D1*(t-t0)+D2*(t-t0)^2$, and
wherein:

D0 denotes a feeder link delay at the reference time,

D1 denotes a feeder link delay drift rate, and

D2 denotes a feeder link delay drift rate variation.

11. The method of claim 10, wherein the receiving of the group common TA command comprises receiving the group common TA command in a physical downlink control channel (PDCCH) with either a specific downlink control information (DCI) format or an existing DCI format using a group common radio network temporary identifier (RNTI).

12. The method of claim 10, wherein the receiving of the group common TA command comprises receiving the group common TA command as a part of a medium access control (MAC) control element (CE) scheduled on a group common physical downlink shared channel (PDSCH) allocation.

13. The method of claim 10, further comprising:

signaling, by the processor, to the network a capability of simultaneous operation with a Global Navigation Satellite System (GNSS).

14. The method of claim 13, further comprising:

transmitting, by the processor, to the network a request for a GNSS measurement window; and receiving, by the processor, from the network an acknowledgement of the request.

15. An apparatus implementable in a user equipment (UE), comprising:

a transceiver configured to communicate wirelessly with a network; and a processor coupled to the transceiver and configured to perform operations comprising:

receiving, via the transceiver, from a network information of a common timing advance (TA), a common TA drift rate, and a common TA drift rate variation at a reference time;

determining a TA delay based on the information; and performing, via the transceiver, non-terrestrial network (NTN) communications with the network with the TA delay accounted for, wherein, in determining the TA delay, the processor is configured to determine:

a TA component (TA(t) due to a feeder link delay (D(t)) in the NTN communications as TA(t)=2*D(t); and a feeder link delay (D(t)) at a time t from the reference time (t0) as $D(t)=D0+D1*(t-t0)+D2*(t-t0)^2$, and wherein:

D0 denotes a feeder link delay at the reference time,

D1 denotes a feeder link delay drift rate, and

D2 denotes a feeder link delay drift rate variation.

16. The apparatus of claim 15, wherein, in determining the TA delay, the processor is configured to determine a feeder link TA.

17. The apparatus of claim 15, wherein the reference time comprises a fixed reference time, and wherein the fixed reference time is either:

a frame boundary at or after an ending boundary of a system information (SI) window in which a system information block (SIB) containing the information is transmitted, or a start of a frame or a fixed offset from the start or an end of the frame or slot in which the SIB containing the information is transmitted.

18. The apparatus of claim 15, wherein:

in an event that downlink (DL) and uplink (UL) subframes in the NTN communications are aligned at a terrestrial network node of the network at the reference time, a time used in determining the TA delay corresponds to an UL reception time at the terrestrial network node; and in an event that the DL and UL subframes in the NTN communications are aligned at a non-terrestrial (NT) network node of the network at the reference time, the time used in determining the TA delay corresponds to another UL reception time at the NT network node.

19. The apparatus of claim 15, wherein either or both that:

a value of at least one of the D0, D1 and D2 is signaled by the network, and another value of at least one of the D0, D1 and D2 is defined in a 3rd Generation Partnership Project (3GPP) specification.

* * * * *